No. 808,677. PATENTED JAN. 2, 1906.
W. L. PAUL.
COUPLING FOR AGRICULTURAL IMPLEMENTS, &c.
APPLICATION FILED APR. 17, 1905.
2 SHEETS—SHEET 1.
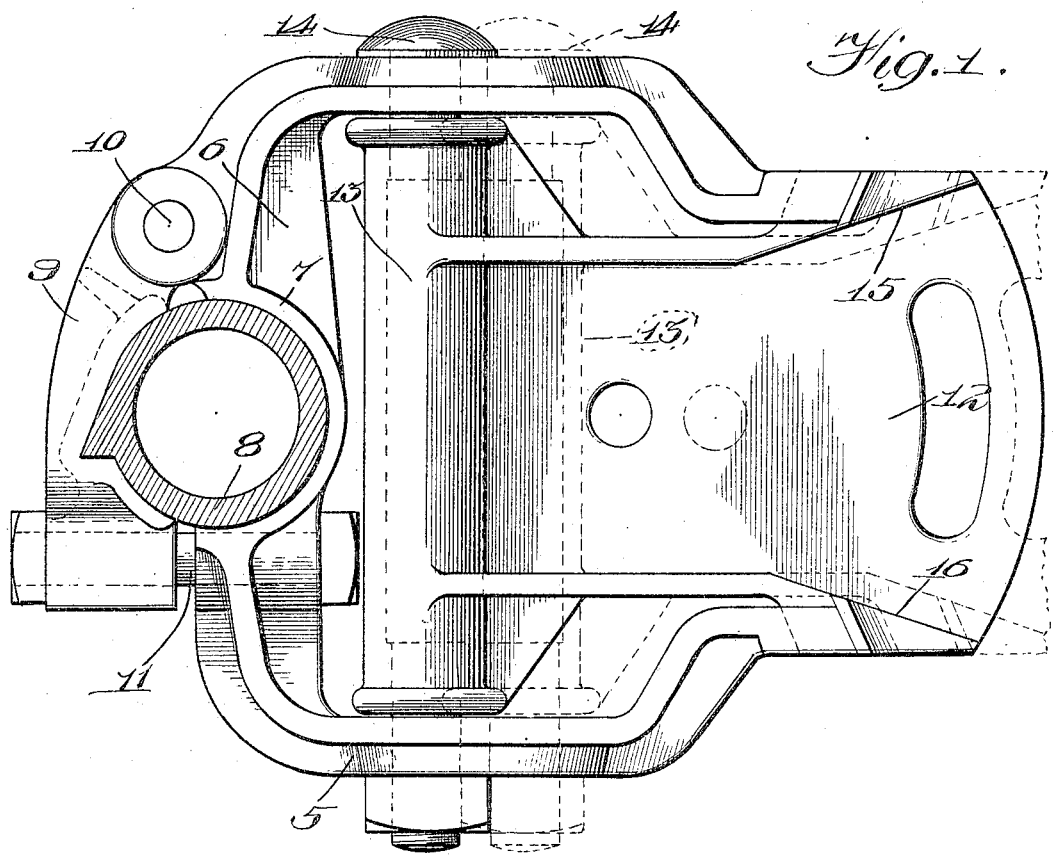
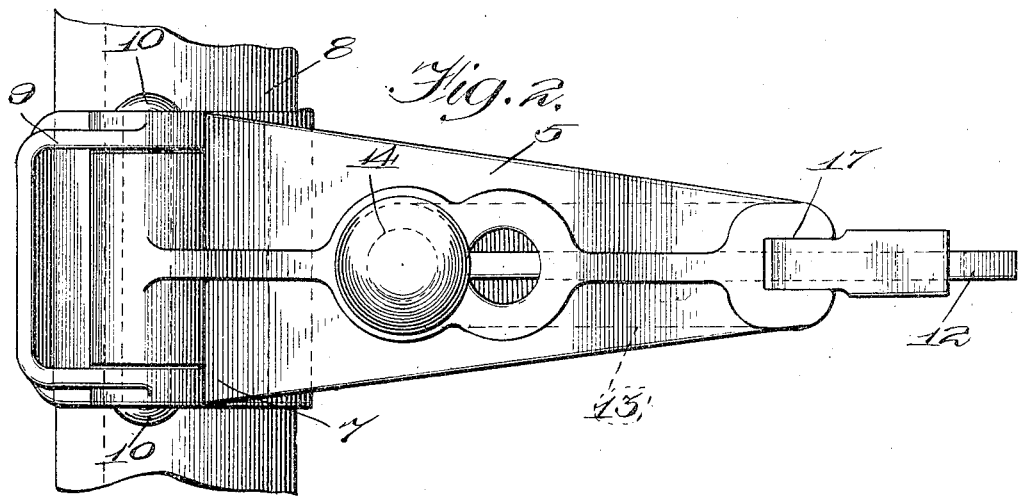
Witnesses:
Inventor
William L. Paul,
by Bond Adams Pickard Jackson
Attys.

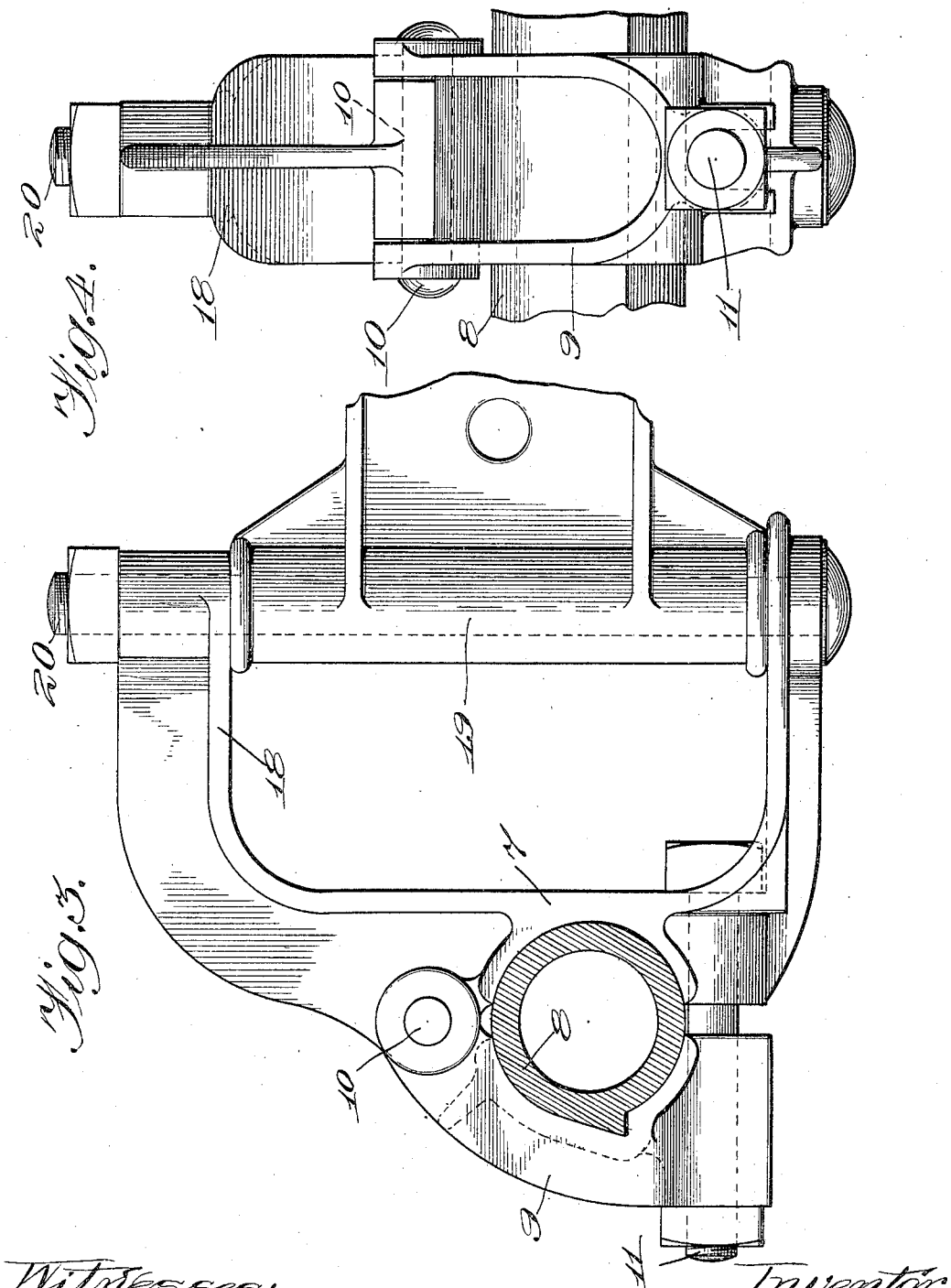

UNITED STATES PATENT OFFICE.

WILLIAM L. PAUL, OF BRADLEY, ILLINOIS, ASSIGNOR TO DAVID BRADLEY MANUFACTURING COMPANY, OF BRADLEY, ILLINOIS, A CORPORATION OF ILLINOIS.

COUPLING FOR AGRICULTURAL IMPLEMENTS, &c.

No. 808,677.   Specification of Letters Patent.   Patented Jan. 2, 1906.

Application filed April 17, 1905. Serial No. 256,023.

*To all whom it may concern:*

Be it known that I, WILLIAM L. PAUL, a citizen of the United States, residing at Bradley, in the county of Kankakee and State of Illinois, have invented certain new and useful Improvements in Couplings for Agricultural Implements, &c., of which the following is a specification, reference being had to the accompanying drawings.

My invention relates to couplings for cultivators and other agricultural implements, and has for one of its objects to provide a coupling that may be used either in rigid form or as a pivotal coupling. Sometimes it is desired to use the cultivator with gangs that are free to swing laterally, while at other times it is desired to have the gangs held rigidly against lateral swinging, and the purpose of my invention is to provide a coupling by which the gangs may be held either rigidly or pivotally, so far as lateral movement is concerned, as preferred.

A further object is to provide improved means for securing the coupling to the cultivator-arch or other support, so that it may readily be removed or replaced.

I accomplish these objects as illustrated in the drawings and as hereinafter described.

What I regard as new is set forth in the claims.

In the accompanying drawings, Figure 1 is a side view of my improved coupling embodying both the features hereinbefore mentioned. Fig. 2 is a plan view thereof. Fig. 3 is a view of a coupling having only my improved connecting devices, and Fig. 4 is an end view thereof.

I will first describe the form of coupling shown in Figs. 1 and 2, which embodies both of my improvements. Referring to Figs. 1 and 2, 5 indicates the frame of the coupling, which, generally speaking, is U-shaped, being open at the rear or at the right-hand side, as shown in Fig. 1. The front side 6 of the coupling, which corresponds with the bottom of the U, is provided with a semicircular bearing 7, adapted to receive a sleeve 8 or other part to which the coupling is to be secured. 9 indicates a swinging arm or latch, which is pivoted at 10 to the side piece 6 and is adapted to swing toward and from said side piece and to be secured thereto by a bolt 11, passing through said side piece and through the free end of said latch. The inner side of the latch 9 is shaped to conform to the sleeve 8. If desired, instead of securing the latch directly to a sleeve it may be secured directly to the arch or other support. In the drawings I have shown the latch as being non-rotatably secured upon the sleeve 8; but obviously if the part 8 is made circular in cross-section the latch would be free to rotate thereupon. 12 indicates a bracket to which the cultivator-gangs are secured and by which they are pivotally connected with the frame 5. As shown, said bracket is provided at its inner end with a sleeve 13, the length of which is slightly less than the greatest vertical diameter of the frame 5. Said sleeve is adapted to aline with suitable holes in the upper and lower parts of the frame, so that said parts may be pivotally connected together by a pivot-bolt 14. Two holes are provided at the top and bottom of the frame 5, as shown in Fig. 2, so that the bracket 12 may be shifted within the frame to cause its free end to project beyond the free ends of the frame, as indicated by dotted lines in Fig. 1. The upper and lower edges of the free end of the bracket 12 are inclined so as to converge inwardly, as shown at 15 16 in Fig. 1, and such inclined edges of the bracket 12 are adapted to fit into notches 17 in the ends of the frame 5, as shown in full lines in Figs. 1 and 2. This position is assumed when the pivot-bolt 14 is in its innermost position. By placing the pivot-bolt 14 in the other pair of holes, however, the end of the bracket 12 projects far enough beyond the notches 17 so that the edges of the bracket clear the ends of the frame, and consequently the bracket is permitted to swing freely upon its pivot. When in its innermost position the bracket is of course held rigidly against lateral swinging by its engagement with said notches. I thus provide a convertible coupling which may be used either as a rigid coupling or as a pivotal one, the only adjustment necessary being to shift the position of the pivot-bolt and bracket.

In Figs. 3 and 4 I have shown the application of my improved latch to a coupling in which the bracket is at all times pivotally connected with the frame. Referring to said figures, 18 indicates the frame, 19 the bracket, and 20 the pivot-bolt. The parts of the latch are indicated by the same reference-numbers as in Figs. 1 and 2.

While I have described in detail the embodiment of my invention illustrated in the drawings, I wish it to be understood that I do not restrict myself to the details of construction except in so far as they are particularly claimed, as my invention includes generically the subject-matter of the broader claims.

That which I claim as my invention, and desire to secure by Letters Patent, is—

1. A coupling, comprising a frame, a bracket, a pivotal connection between said frame and bracket, and means for rigidly connecting said frame and bracket.

2. A coupling, comprising a frame, a bracket, a pivotal connection between said frame and bracket, and means carried by said frame for rigidly connecting said frame and bracket.

3. A coupling, comprising a frame, a bracket, and a pivotal connection between said frame and bracket, said bracket being movable into or out of position to rigidly engage said frame.

4. A coupling, comprising a frame, a bracket adapted to fit therein and movable into and out of locking engagement therewith, and a pivotal connection between said frame and bracket.

5. A coupling, comprising a U-shaped frame, a bracket adapted to fit therein and movable into and out of locking engagement therewith, and a pivotal connection between said frame and bracket.

6. A coupling, comprising a U-shaped frame having notches in one or both ends thereof, a bracket adapted to fit in said frame and movable into and out of said notches, and a pivotal connection between said frame and bracket.

7. A coupling, comprising a U-shaped frame having notches in one or both ends thereof, a bracket adapted to fit therein, said bracket having inclined edges movable into or out of said notches, and a pivotal connection between said frame and bracket.

8. A coupling, comprising a frame, a bracket, a swinging arm pivotally connected with said frame and coacting therewith to form a latch, and means for connecting the free end of said arm with said frame.

WILLIAM L. PAUL.

Witnesses:
JOHN L. JACKSON,
MINNIE A. HUNTER.